(12) United States Patent
Hosomi et al.

(10) Patent No.: US 10,975,899 B2
(45) Date of Patent: Apr. 13, 2021

(54) WELDED MEMBER AND METHOD FOR MANUFACTURING SAME

(71) Applicant: NIPPON STEEL NISSHIN CO., LTD., Tokyo (JP)

(72) Inventors: Kazuaki Hosomi, Tokyo (JP); Tomokazu Nobutoki, Tokyo (JP); Takefumi Nakako, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 46 days.

(21) Appl. No.: 16/344,435

(22) PCT Filed: Sep. 15, 2017

(86) PCT No.: PCT/JP2017/033542
§ 371 (c)(1),
(2) Date: Apr. 24, 2019

(87) PCT Pub. No.: WO2018/079131
PCT Pub. Date: May 3, 2018

(65) Prior Publication Data
US 2020/0056643 A1    Feb. 20, 2020

(30) Foreign Application Priority Data

Oct. 28, 2016  (JP) .............................. JP2016-212074

(51) Int. Cl.
*C23C 2/06* (2006.01)
*C23C 2/40* (2006.01)
(Continued)

(52) U.S. Cl.
CPC .................. *F16B 5/08* (2013.01); *B23K 9/02* (2013.01); *B23K 9/0256* (2013.01); *B23K 9/09* (2013.01);
(Continued)

(58) Field of Classification Search
CPC .. F16B 5/08; B23K 35/38; B23K 9/09; B23K 9/02; B23K 9/23; B23K 9/0256;
(Continued)

(56) References Cited

U.S. PATENT DOCUMENTS 5,326,957 A * 7/1994 Karube .................. B23K 9/167
                                                 219/137 WM
6,359,260 B1   3/2002 Peel et al.
(Continued)

FOREIGN PATENT DOCUMENTS

CN    103930231 A    7/2014
CN    104364043 A    2/2015
(Continued)

OTHER PUBLICATIONS

Noland, "Shielding gas blends for carbon steel GMAW," in The Welder, www.thefabricator.com, Sep. 2015, 5 pages, downloaded on Aug. 11, 2020. (Year: 2015).*
(Continued)

*Primary Examiner* — Michael E. La Villa
(74) *Attorney, Agent, or Firm* — Mintz Levin Cohn Ferris Glovsky; David G. Conlin; Steven M. Jensen (57) ABSTRACT

A welded member includes a hot dip Zn-based alloy coated steel sheet as a base material and has excellent corrosion resistance and weld bead shear strength. In the welded member in which a lower sheet and an upper sheet, which are hot dip Zn-based alloy coated steel sheets, are stacked and arc-welded together, a weld bead is formed so that a cross-sectional width W satisfies the following formula $2T \leq W \leq 6T$, and a blowhole occupancy Br represented by the following formula becomes not more than 50%: $Br = (\Sigma di/L) \times 100$, where T represents a thickness of the hot dip Zn-based alloy coated steel sheet, di represents a length of
(Continued)

an i-th blowhole observed in X-ray radiography, and L represents a length of the weld bead.

12 Claims, 4 Drawing Sheets

(51) Int. Cl.

| | |
|---|---|
| C22C 18/04 | (2006.01) |
| B23K 9/025 | (2006.01) |
| F16B 5/08 | (2006.01) |
| B23K 9/09 | (2006.01) |
| B23K 9/02 | (2006.01) |
| B23K 9/23 | (2006.01) |
| B32B 15/04 | (2006.01) |
| B23K 9/16 | (2006.01) |
| C23C 30/00 | (2006.01) |
| B32B 15/01 | (2006.01) |
| B23K 35/38 | (2006.01) |
| C22C 18/00 | (2006.01) |
| B32B 15/18 | (2006.01) |
| B23K 101/00 | (2006.01) |
| B23K 101/34 | (2006.01) |

(52) U.S. Cl.
CPC ............... *B23K 9/16* (2013.01); *B23K 9/23* (2013.01); *B23K 35/38* (2013.01); *B32B 15/011* (2013.01); *B32B 15/013* (2013.01); *B32B 15/04* (2013.01); *B32B 15/043* (2013.01); *B32B 15/18* (2013.01); *C22C 18/00* (2013.01); *C22C 18/04* (2013.01); *C23C 2/06* (2013.01); *C23C 2/40* (2013.01); *C23C 30/00* (2013.01); *C23C 30/005* (2013.01); *B23K 2101/006* (2018.08); *B23K 2101/34* (2018.08); *Y10T 428/12799* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/26* (2015.01); *Y10T 428/27* (2015.01)

(58) Field of Classification Search
CPC ............... B23K 9/16; B23K 2101/006; B23K 2101/34; C22C 18/00; C22C 18/04; C23C 2/06; C23C 2/04; C23C 30/00; C23C 30/005; C23C 2/40; B32B 15/013; B32B 15/011; B32B 15/04; B32B 15/043; B32B 15/18; Y10T 428/12799; Y10T 428/12958; Y10T 428/12965; Y10T 428/12972; Y10T 428/12979; Y10T 428/12993; Y10T 428/26; Y10T 428/27
See application file for complete search history.

(56) References Cited

U.S. PATENT DOCUMENTS

| | | |
|---|---|---|
| 2014/0202993 A1 | 7/2014 | Kawamoto et al. |
| 2015/0027995 A1 | 1/2015 | Izutani et al. |
| 2015/0041449 A1 | 2/2015 | Fujiwara et al. |
| 2015/0136741 A1 | 5/2015 | Hosomi et al. |
| 2017/0355035 A1 | 12/2017 | Fujiwara et al. |

FOREIGN PATENT DOCUMENTS

| | | |
|---|---|---|
| JP | 2004-090017 A | 3/2004 |
| JP | 2011-131243 A | 7/2011 |
| JP | 2013-184216 A | 9/2013 |
| JP | 2014-133259 A | 7/2014 |
| JP | 2016-168612 A | 9/2016 |
| RU | 2015100899 A | 8/2016 |

OTHER PUBLICATIONS

Pagano et al., "Metal-Cored Wire for Welding Galvanized Steel Full Speed Ahead," Metal Forming Magazine, Sep. 1, 2013.
Supplemental European Search Report dated Oct. 23, 2019 in corresponding European Patent Application No. 17863731.0.
Office Action dated Dec. 9, 2019 in corresponding Chinese Patent Application No. 201780066365.6.
Office Action dated Jun. 14, 2019 in corresponding Canadian Application No. 3,041,439.
Office Action issued in co-pending Japanese Patent Application No. 2016-212074 dated Mar. 6, 2018.
English-language translation of International Preliminary Report on Patentability for International Application No. PCT/JP2017/033542 dated Apr. 30, 2019.
International Search Report for International Application No. PCI/JP2017/033542 dated Oct. 17, 2017.

\* cited by examiner

IP: PEAK CURRENT (A)
PP: PEAK PERIOD (ms)
PFQ: PERIOD (ms)
IB: BASE CURRENT (A)

WELDED MEMBER AND METHOD FOR MANUFACTURING SAME

TECHNICAL FIELD

The present invention relates to (i) a welded member in which hot dip Zn-based alloy coated steel sheets are arc-welded to each other and to (ii) a method for manufacturing the welded member.

BACKGROUND ART

A hot dip zinc-based alloy coated steel sheet (hot dip Zn-based alloy coated steel sheet) has good corrosion resistance, and is therefore used for a wide range of purposes such as a construction member and an automobile member. In particular, a hot dip Zn—Al—Mg alloy coated steel sheet containing Al in an amount of not less than 1% by mass maintains excellent corrosion resistance over a long time period. From this, such a hot dip Zn—Al—Mg alloy coated steel sheet is in increasing demand as an alternative to a conventional hot dip Zn coated steel sheet in which a coating layer contains only zinc as a main component. Note that a coating layer included in a conventional hot dip Zn coated steel sheet generally has an Al concentration of not more than 0.3% by mass (see JIS G3302).

In a case where hot dip Zn-based alloy coated steel sheets are used for a construction member, an automobile member, or the like, the hot dip Zn-based alloy coated steel sheets are often assembled by an arc welding process. However, in a case where the hot dip Zn-based alloy coated steel sheets are arc-welded, blowholes are excessively generated in the hot dip Zn-based alloy coated steel sheets, and arc weldability of the hot dip Zn-based alloy coated steel sheets is deteriorated. Blowholes are pores contained in a weld bead which is a part obtained when a part of a base material and a deposited metal melt together during welding and then solidify by cooling).

The boiling point of Zn (approximately 906° C.) is lower as compared with the melting point of Fe (approximately 1538° C.), and therefore Zn vapor is generated during arc welding, and the Zn vapor is confined in the weld bead. This is the reason why blowholes occur. The excessively generated blowholes cause a problem of reduction in weld strength.

Figure 8:
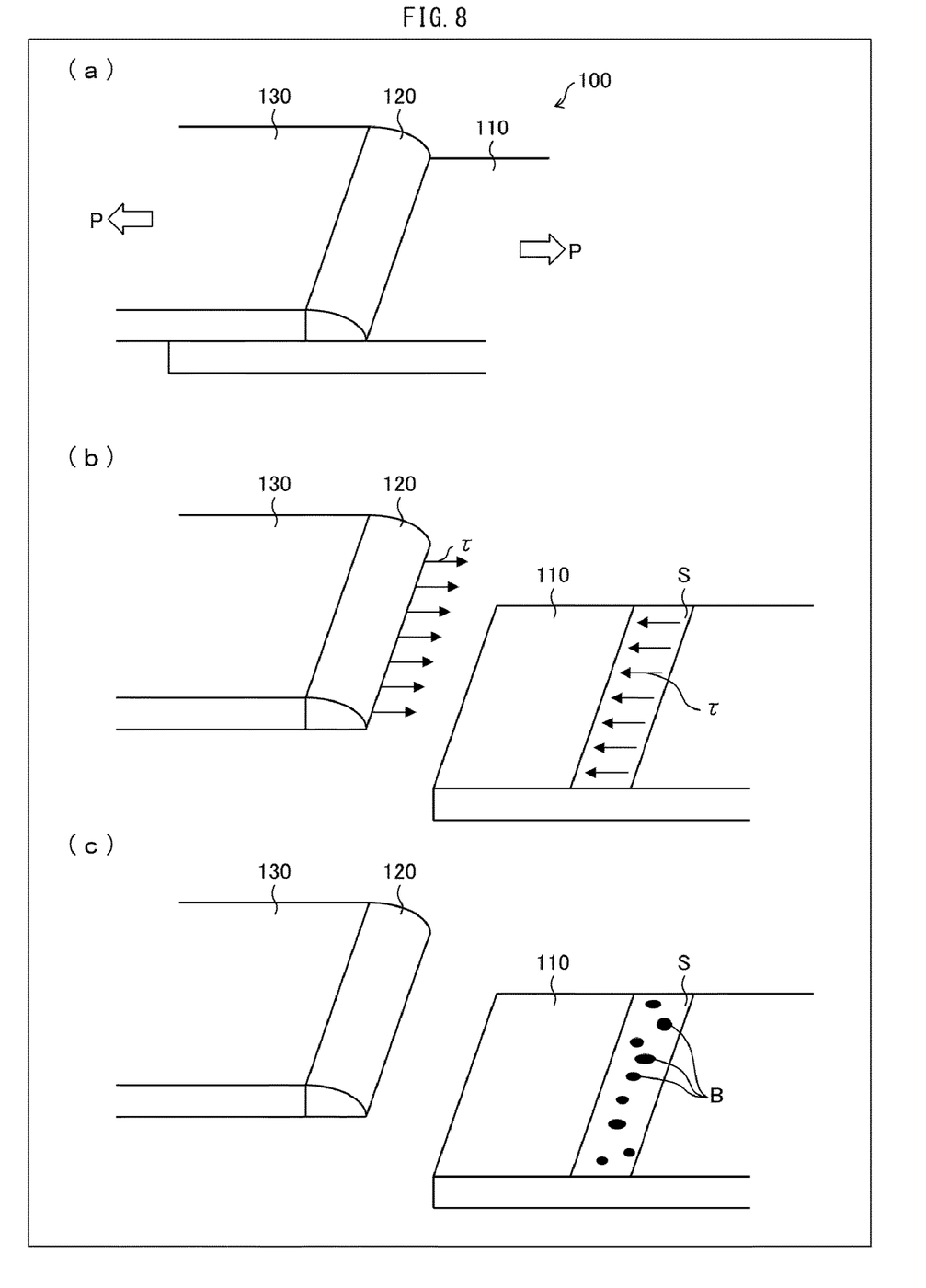

The reduction of the weld strength due to the generation of this blowhole will be further explained below with reference to (a) through (c) of FIG. 8. Each of (a) through (c) of FIG. 8 is a perspective view schematically illustrating a welded member obtained by fillet welding with a lap joint. Such a welded member is often used in a construction member, an automobile member, and the like. Note that, for convenience of explanation, each of (b) and (c) of FIG. 8 illustrates the welded member in which an upper sheet and a lower sheet are separated.

As illustrated in (a) of FIG. 8, in a case where a tensile load P is applied to a welded member 100 formed by fillet welding carried out while a lower sheet 110 and an upper sheet 130 are arranged in a lap joint manner, the following can be said: That is, in this case, a shear stress τ is applied to a shear plane S of a weld bead 120 at a surface position of the lower sheet 110 (see (b) of FIG. 8). If an excessive load is applied to the welded member 100 and the shear strength of the weld bead 120 is greater than the shear stress τ, the weld bead 120 does not break but the upper sheet 130 or lower sheet 110 serving as a base material breaks (i.e., the base material breaks). Therefore, joint strength as designed can be obtained.

However, as illustrated in (c) of FIG. 8, in a case where blowholes B occur in the weld bead 120, an area of the shear plane S decreases. Therefore, in a case where an excessive load is applied to the welded member 100, the shear strength of the weld bead 120 becomes smaller than the shear stress τ, and the weld bead 120 breaks instead of the base material. This is problematic because the designed joint strength cannot be obtained.

In particular, a heavy-weight hot dip Zn-based alloy coated steel sheet having a coating weight of 90 g/m$^2$ or more is used in a member that is required to have long-term durability. In this case, an amount of Zn vapor generated during arc-welding increases as a hot dip Zn-based alloy coated steel sheet becomes heavier in weight, and therefore blowholes are further excessively generated. This causes a problem that the shear strength of the weld bead 120 is easily reduced.

Under the circumstances, as a method for inhibiting spatters and blowholes from being generated when a hot dip Zn-based alloy coated steel sheet is welded, a pulsed arc welding process in which a welding wire is used as an electrode has been proposed. According to the pulsed arc welding process, a molten pool (which is a weld bead part before solidification) is stirred by a pulsed arc, and the molten pool is pressed down to become thin. This facilitates discharge of Zn vapor and generation of blowholes is inhibited.

For example, Patent Literature 1 discloses a pulsed arc welding process in which generation of spatters and blowholes is inhibited by controlling a welding wire composition and a shielding gas composition, and a peak current, a peak period, a pulsed current waveform such as a frequency, and the like.

CITATION LIST

Patent Literature

Patent Literature 1: Japanese Patent Application Publication, Tokukai, No. 2013-184216 (Publication Date: Sep. 19, 2013)

SUMMARY OF INVENTION

Technical Problem

However, even in a case where the pulsed arc welding process is used, the generation of blowholes cannot be completely inhibited. In particular, in a case where heavy-weight hot dip Zn-based alloy coated steel sheets which have excellent corrosion resistance are welded together, blowholes are more likely to occur and strength of a welded joint may be deteriorated.

The present invention is accomplished in view of such a current situation, and its object is to provide a welded member which includes a hot dip Zn-based alloy coated steel sheet as a base material and is excellent in corrosion resistance and in shear strength of a weld bead, and to provide a method for manufacturing such a welded member.

Solution to Problem

As a result of diligent studies by the inventors of the present invention, the following new finding was made. That is, even in a case where blowholes occur to some extent when hot dip Zn-based alloy coated steel materials having a coating weight of 15 g/m² to 250 g/m² per surface are, for example, fillet-welded with a lap joint, a weld bead has excellent shear strength, provided that a cross-sectional width and a blowhole occupancy Br of the weld bead at a surface position of the lower sheet are set within appropriate ranges. Based on this new finding, the present invention is accomplished.

That is, a welded member in accordance with an aspect of the present invention includes: a first hot dip Zn-based alloy coated steel sheet; a second hot dip Zn-based alloy coated steel sheet stacked on and arc-welded to a first sheet surface of the first hot dip Zn-based alloy coated steel sheet; and a weld bead that is provided on the first sheet surface such that the first hot dip Zn-based alloy coated steel sheet and the second hot dip Zn-based alloy coated steel sheet are welded together by the weld bead, each of the first hot dip Zn-based alloy coated steel sheet and the second hot dip Zn-based alloy coated steel sheet having a coating weight of 15 g/m² to 250 g/m² per surface, the weld bead being formed such that a cross-sectional width W satisfies a formula (1) below and a blowhole occupancy Br represented by a formula (2) below becomes not more than 50%, the cross-sectional width W being a width of a cross section from one boundary between a Zn-based coating layer and the weld bead to the other boundary between the Zn-based coating layer and the weld bead on the first sheet surface, and the cross section being obtained by cutting the weld bead by a plane orthogonal to a direction in which the weld bead extends.

$$2T \le W \le 6T \quad (1)$$

$$Br=(\Sigma di/L) \times 100 \quad (2)$$

where:

T represents a thickness of any of the first hot dip Zn-based alloy coated steel sheet and the second hot dip Zn-based alloy coated steel sheet and, in a case where a thickness of the first hot dip Zn-based alloy coated steel sheet is different from a thickness of the second hot dip Zn-based alloy coated steel sheet, T represents a smaller one of the thickness of the first hot dip Zn-based alloy coated steel sheet and the thickness of the second hot dip Zn-based alloy coated steel sheet;

di represents a length of an i-th blowhole observed in X-ray radiography; and

L represents a length of the weld bead.

A manufacturing method of a welded member in accordance with an aspect of the present invention is a method for manufacturing a welded member by a pulsed arc welding process in which a second hot dip Zn-based alloy coated steel sheet that is stacked on a first sheet surface of a first hot dip Zn-based alloy coated steel sheet is arc-welded to the first hot dip Zn-based alloy coated steel sheet with an arc generated by alternately supplying a peak current and a base current, said method including: a welding step of forming a weld bead on the first sheet surface such that the first hot dip Zn-based alloy coated steel sheet and the second hot dip Zn-based alloy coated steel sheet are welded together by the weld bead, each of the first hot dip Zn-based alloy coated steel sheet and the second hot dip Zn-based alloy coated steel sheet having a coating weight of 15 g/m² to 250 g/m² per surface, the welding step forming the weld bead such that a cross-sectional width W satisfies a formula (1) below and a blowhole occupancy Br represented by a formula (2) below becomes not more than 50%, the cross-sectional width W being a width of a cross section from one boundary between a Zn-based coating layer and the weld bead to the other boundary between the Zn-based coating layer and the weld bead on the first sheet surface, and the cross section being obtained by cutting the weld bead by a plane orthogonal to a direction in which the weld bead extends.

$$2T \le W \le 6T \quad (1)$$

$$Br=(\Sigma di/L) \times 100 \quad (2)$$

where:

T represents a thickness of any of the steel sheets in the cross section and, in a case where a thickness of the first hot dip Zn-based alloy coated steel sheet is different from a thickness of the second hot dip Zn-based alloy coated steel sheet, T represents a smaller one of the thickness of the first hot dip Zn-based alloy coated steel sheet and the thickness of the second hot dip Zn-based alloy coated steel sheet;

di represents a length of an i-th blowhole observed in X-ray radiography; and

L represents a length of the weld bead.

Advantageous Effects of Invention

According to an aspect of the present invention, it is possible to bring about an effect of providing the welded member which includes a hot dip Zn-based alloy coated steel sheet as a base material and is excellent in corrosion resistance and in shear strength of a weld bead, and providing a method for manufacturing such a welded member.

BRIEF DESCRIPTION OF DRAWINGS

(a) of FIG. 8 is a perspective view schematically illustrating a welded member obtained by fillet welding with a lap joint. (b) of FIG. 8 is a perspective view schematically illustrating an applied state of a shear stress when the welded member receives a tensile load, while dividing the welded member into an upper sheet and a lower sheet. (c) of FIG. 8 is a perspective view schematically illustrating a cross section of the weld bead in which blowholes are generated in the welded member.

DESCRIPTION OF EMBODIMENTS

The following description will discuss embodiments of the present invention. Note that the following descriptions are aimed merely at better understanding of the gist of the invention, and do not limit the present invention unless otherwise specified. In the present application, "A to B" means A or more (higher) and B or less (lower).

Various measures have been proposed to inhibit generation of blowholes in welding. However, it is difficult to inhibit generation of blowholes in a case where a weight of a coating layer is heavy or the like, and strength of the welded part may be deteriorated.

Under the circumstances, the inventors of the present invention carried out the diligent study and, as a result, the following new conception has been obtained. That is, in a case where arc-welding is carried out between hot dip Zn-based alloy coated steel materials having a coating weight of 15 g/m² to 250 g/m² per surface: (i) an area of shear plane S (see (b) of FIG. 8) of the weld bead can be increased by widening a cross-sectional width W (described later in detail) in the weld bead and, (ii) even in a case where blowholes occur to some extent, deterioration in shear strength can be prevented by setting the blowhole occupancy Br (described later) to be not more than 50%.

Based on this new finding, the inventors of the present invention have accomplished the present invention as a result of further study while using, for example, a pulsed arc welding process as a welding process capable of widening the cross-sectional width W while inhibiting generation of blowholes. The following description will discuss details of an embodiment of the present invention.

[Welded Member]

Figure 1:
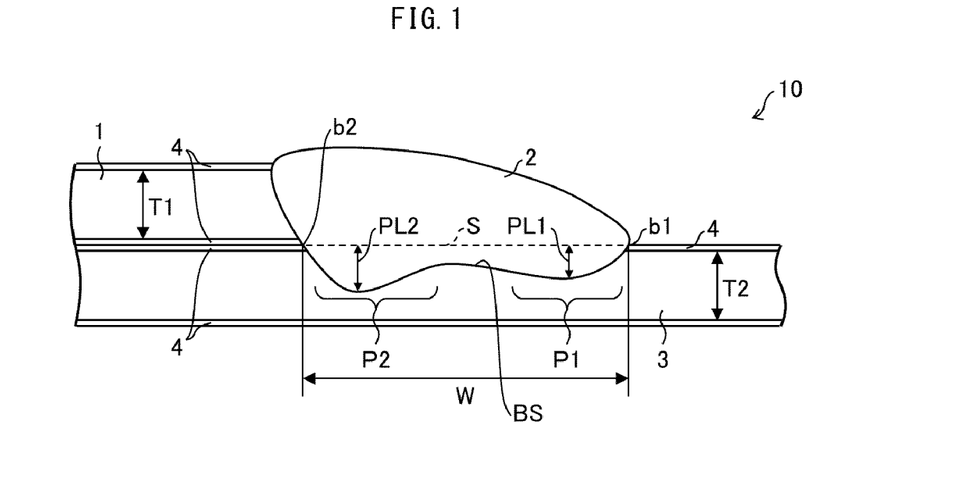
FIG. 1 is a schematic view illustrating a cross section of a welded member in accordance with an embodiment of the present invention, the cross section being orthogonal to a direction in which the weld bead extends.

FIG. 1 is a schematic view illustrating a cross section (hereinafter referred to as "joint cross section") of a welded member 10 in accordance with the present embodiment, the cross section being obtained by cutting the welded member 10 by a plane orthogonal to a direction in which a weld bead 2 extends. As illustrated in FIG. 1, the welded member 10 is a lap joint welded member obtained by arranging an upper sheet 1 (second hot dip Zn-based alloy coated steel sheet) on a lower sheet 3 (first hot dip Zn-based alloy coated steel sheet) in a lap joint manner and fillet-welding the upper sheet 1 and the lower sheet 3. In the welded member 10, the weld bead 2 is provided as a fillet welded part. Among wide surfaces of the upper sheet 1 and the lower sheet 3, surfaces located above in FIG. 1 is referred to as "upper surface", and surfaces opposite to the respective upper surfaces are referred to as "lower surface". In the welded member 10, the upper sheet 1 and the lower sheet 3 are arranged so that a lower surface of the upper sheet 1 and an upper surface of the lower sheet 3 are in contact with each other.

In the present embodiment, as an example of the welded member in accordance with an aspect of the present invention, the welded member is described which is obtained by fillet welding with a lap joint using a pulsed arc welding process. Note, however, that the welded member in accordance with an aspect of the present invention is not necessarily limited to this example. For example, a joint shape of the welded member may be a strapped joint and the weld may be slot weld. In addition, the welding process is not limited to the pulsed arc welding process, provided that the welded member in accordance with an aspect of the present invention can be manufactured. By applying the present invention to a case where a member coated with a hot dip Zn-based alloy is placed on and welded to the lower sheet 3, it is possible to obtain a welded member which is excellent in shear strength of the weld bead.

Each of the lower sheet 3 and the upper sheet 1 is a hot dip Zn-based alloy coated steel sheet. Surfaces of each of the lower sheet 3 and the upper sheet 1 are coated with a Zn-based coating layer 4, except for a part in which the weld bead 2 is formed. Hereinafter, each of the lower sheet 3 and the upper sheet 1 is sometimes referred to as "base material".

The weld bead 2 is formed by pulsed-arc-welding the upper surface (first sheet surface) of the lower sheet 3 to a lateral surface which is of the upper sheet 1, extends orthogonally to the upper surface of the upper sheet 1, and is in a longitudinal direction of the upper sheet 1. The weld bead 2 is a part in which the lower sheet 3, the upper sheet 1, the Zn-based coating layer 4, and a deposited metal (welding wire) which are melted in welding are blended together and solidified by cooling. The weld bead 2 is formed by using, for example, a pulsed MAG welding process.

(Cross-Sectional Width of Weld Bead)

As illustrated in FIG. 1, a cut surface of the weld bead 2 cut with a virtual plane including the upper surface of the lower sheet 3 is defined as a shear plane S (see (b) of FIG. 8).

The welded member 10 in accordance with the present embodiment is formed such that a width of the shear plane S (hereinafter referred to as "cross-sectional width W") in a joint cross section orthogonal to a direction in which the weld bead 2 extends satisfies a formula (1) below:

$$2T \leq W \leq 6T \quad (1)$$

Here, T is a thickness of the hot dip Zn-based alloy coated steel sheet and, in a case where a thickness T2 of the lower sheet 3 is different from a thickness T1 of the upper sheet 1, T is a smaller one of the thicknesses T1 and T2. This is because of the following reasons. That is, in a case where the thickness T2 of the lower sheet 3 is different from the thickness T1 of the upper sheet 1 and shear strength of the weld bead 2 is greater than shear stress τ, the base material which is the thinner one of the upper sheet 1 and the lower sheet 3 breaks. That is, in a case where an excessive load is applied to the welded member 10 to break the base material, joint strength of the welded member 10 (i.e., a load with which the base material breaks) depends on the thickness of the thinner one of the upper sheet 1 and the lower sheet 3. Therefore, in a case where a relatively smaller thickness between the thickness T2 of the lower sheet 3 and the thickness T1 of the upper sheet 1 is defined as T and the cross-sectional width W represented by the above formula (1) satisfies 2T or more, the base material is to break instead of the weld bead when an excessive load is applied to the welded member 10. If T is a greater one of the thickness of the upper sheet 1 and the thickness of the lower sheet 3, the cross-sectional width W will become wider more than necessary.

In the weld bead 2, the cross-sectional width W satisfies the above formula (1) at any position in the direction in which the weld bead 2 extends.

If the cross-sectional width W is less than twice a sheet thickness, a cross-sectional area of the shear plane S becomes small, and this results in insufficient shear strength.

On the other hand, if the cross-sectional width W exceeds 6 times the sheet thickness, a volume of the weld bead 2 becomes excessively large, so that a cost of carrying out a welding process becomes higher, and it becomes difficult to carry out the welding process. A surface of the weld bead 2 is not covered with a Zn-based coating layer, and is therefore inferior in corrosion resistance. From this, if the cross-sectional width W exceeds 6 times the sheet thickness, the surface area of the weld bead 2 becomes unnecessarily large, and this is not preferable.

In other words, the cross-sectional width W is, in the joint cross section, a distance of the virtual plane including the upper surface of the lower sheet 3 from one boundary b1 between the Zn-based coating layer 4 and the weld bead 2 to the other boundary b2 between the Zn-based coating layer 4 and the weld bead 2. Here, the boundary b2 is a boundary closer to the upper sheet 1 and is a boundary between the weld bead 2 and the Zn-based coating layer 4 which covers the lower surface of the upper sheet 1.

(Blowhole Occupancy)

As described above, blowholes B are inevitably generated to some extent in the arc-welding of the hot dip Zn-based alloy coated steel sheets. In particular, in a case where the Zn-based coating layer 4 is heavy or an Al concentration in the coating layer is high (i.e., in a case of a hot dip Zn-based alloy coated steel sheet which is excellent in corrosion resistance), blowholes B easily occur.

Figure 2:
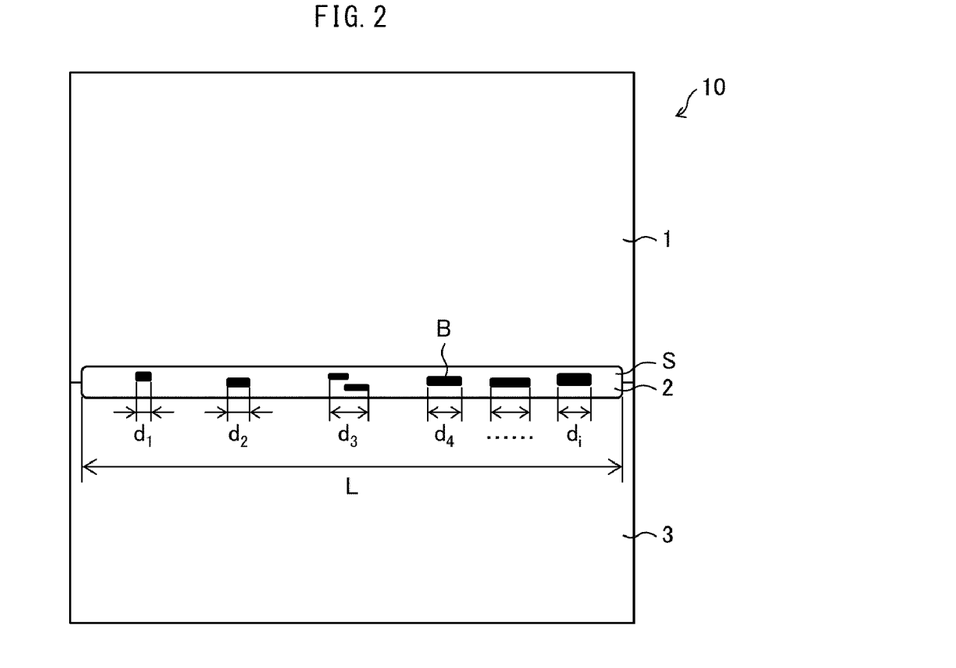
FIG. 2 is a plane view for explaining method for measuring a blowhole occupancy in the welded member.

In the welded member 10 in accordance with the present embodiment, generation of some blowholes B is permissible. An amount of blowholes B in the weld bead 2 will be described using an index called "blowhole occupancy". FIG. 2 is a plane view for explaining a method for measuring a blowhole occupancy in the welded member 10 in accordance with the present embodiment. Here, the shear plane S is shown as a cross section of the weld bead 2.

As illustrated in FIG. 2, blowholes B are formed inside the weld bead 2. A length of the weld bead 2 in a longitudinal direction (i.e., a weld line direction) is defined as "L", and a length of an i-th blowhole from one end of the weld bead 2 is defined as "di". The length di of each of the blowholes can be observed, for example, by X-ray radiography.

The blowhole occupancy is an evaluation index for blowholes defined as follows with reference to the Design and Construction Manual of Sheet Welded Joint for Building (Editorial Board of Design and Construction Manual for Sheet Welded Joint for Building). In other words, the blowhole occupancy Br is defined by a formula (2) below from a measured value of an integrated value Σdi (mm) obtained by measuring and adding up lengths of all blowholes B in the shear plane S of the weld bead 2 schematically illustrated in FIG. 2.

$$Br = (\Sigma di/L) \times 100 \quad (2)$$

In the welded member 10 in accordance with the present embodiment, the blowhole occupancy Br of the weld bead 2 is not more than 50%. In this case, as described above, the cross-sectional area of the shear plane S can be secured by setting the cross-sectional width W of the weld bead 2 to be twice or more the thickness of the hot dip Zn-based alloy coated steel sheet (the smaller thickness if the thickness of the upper sheet 1 is different from the thickness of the lower sheet 3), so that the weld bead 2 has excellent shear strength. This makes it possible to prevent deterioration in shear strength of the welded member 10.

On the other hand, if a large amount of blowholes B are generated and the blowhole occupancy Br is increased, the cross-sectional area of the shear plane S becomes remarkably small. If the blowhole occupancy Br exceeds 50%, the shear strength of the weld bead 2 decreases even in a case where the cross-sectional width W satisfies the above formula (1), and the weld bead 2 may break when a tensile load P is applied.

Note that distribution of the blowholes B in the weld bead 2 is considered to be substantially uniform, and the blowhole occupancy Br in a part other than the shear plane S is considered to be substantially the same as the blowhole occupancy Br of the shear plane S. Therefore, it is possible to presume an amount of the blowholes B in the weld bead 2 based on the blowhole occupancy Br in the shear plane S.

(Coating Weight)

A low coating weight of the hot dip Zn-based alloy coated steel sheet is disadvantageous for maintaining corrosion resistance and sacrificial protection effect of a coated surface over a long period of time. As a result of various studies, a coating weight of not less than 15 $g/m^2$ per surface is more effective. On the other hand, if the coating weight exceeds 250 $g/m^2$, a generation amount of Zn vapor becomes excessively large, and the blowhole occupancy exceeds 50%. Therefore, the welded member 10 in accordance with the present embodiment has the coating weight of not more than 250 $g/m^2$.

As such, the welded member 10 in accordance with the present embodiment is obtained by fillet-welding the hot dip Zn-based alloy coated steel materials together which have the coating weight of 15 $g/m^2$ to 250 $g/m^2$ per surface by use of the pulsed arc process with a lap joint, and the cross-sectional width W of the weld bead 2 satisfies the above formula (1). In the welded member 10 in accordance with the present embodiment, the blowhole occupancy Br of the weld bead 2 is not more than 50%.

In the welded member 10 in accordance with the present embodiment, generation of blowholes B does not need to be greatly inhibited in welding in order to secure shear strength of the weld bead 2. That is, even in a case where welding is carried out under a condition under which blowholes B are easily generated in welding and some blowholes B are generated (Note, however, that the blowhole occupancy Br is not more than 50%), deterioration in shear strength of the welded member 10 can be prevented when the cross-sectional width W satisfies the above formula (1).

From this, it is possible to manufacture the welded member 10 which includes a hot dip Zn-based alloy coated steel sheet as a base material and is excellent in corrosion resistance and in shear strength of the weld bead 2. As a result, it is possible to obtain the welded member 10 which prevents the weld bead from breaking before the base material, and has designed strength.

(Cross-Sectional Shape of Weld Bead)

In the welded member 10 in accordance with the present embodiment, it is preferable that a protrusion part described below is provided in the weld bead 2. The following description will discuss the protrusion part with reference to FIG. 1 again.

As illustrated in FIG. 1, in the welded member 10 in accordance with the present embodiment, the weld bead 2 has two protrusion parts protruding into the lower sheet 3. The two protrusion parts are referred to as protrusion parts P1 and P2, respectively. Here, the protrusion part closer to the upper sheet 1 is the protrusion part P2. In the protrusion part P1, a distance from the shear plane S to an apex of the protrusion part P1 is defined as a protruding length PL1. In the protrusion part P2, a distance from the shear plane S to an apex of the protrusion part P2 is defined as a protruding length PL2.

In the welded member 10 in accordance with the present embodiment, both the protruding length PL1 and the protruding length PL2 are not less than 0.2 mm, and a longer one of the protruding length PL1 and the protruding length PL2 is not greater than the thickness T2 of the lower sheet 3. This allows the welded member 10 in accordance with the present embodiment to have further excellent shear strength of the weld bead 2. This is because the protrusion parts P1 and P2 increase an anchor effect. That is, the protrusion parts P1 and P2 increase an area of a boundary surface BS between the weld bead 2 and an inner part of the lower sheet 3.

Moreover, in the boundary b2, a slope is formed in the weld bead 2 by the protrusion part P2. In other words, in the boundary b2, an angle of an acute angle formed by the surface of the weld bead 2 and the shear plane S (or the upper surface of the lower sheet 3) increases. From this, for example, in a case where a tensile load P is applied to pull the upper sheet 1 leftward and the lower sheet 3 rightward in FIG. 1, the protrusion part P2 is caught in the boundary b2, so that the shear strength can be increased.

Therefore, the protrusion part P2 is preferably longer in protruding length than the protrusion part P1, i.e., it is preferable that the protruding length PL2 is greater than the protruding length PL1.

Moreover, in the boundary surface BS, in a case where a tensile load P is decomposed in a tangential direction and a vertical direction to the boundary surface BS, force acting in the tangential direction (i.e., substantially in-plane direction) of the boundary surface BS can be made smaller because many inclined parts are provided in the boundary surface BS by the protrusion parts P1 and P2, and angles of the inclined parts are relatively steep.

On the other hand, if either one of the protruding length PL1 or the protruding length PL2 is less than 0.2 mm, the shear strength of the part becomes smaller, and the weld bead 2 may break before the base material, i.e., the upper sheet 1 or the lower sheet 3. Conversely, if either one of the protrusion parts P1 and P2 is deeply formed in the lower sheet 3 and the protruding length PL1 or the protruding length PL2 exceeds the thickness of the lower sheet 3, the weld bead 2 penetrates to a back surface of the lower sheet 3 and is exposed. In a case where such a penetration bead is generated, an appearance of the welded part is deteriorated, so that quality requested as a product may not be satisfied. In addition, a step of grinding the penetration bead is necessitated, and this leads to an increase in cost.

Note that the welded member in accordance with an aspect of the present invention only needs to include at least one protrusion part, and may include two or more protrusion parts. Moreover, in a case where two or more protrusion parts are provided, it is only necessary that protruding lengths of at least two protrusion parts are not less than 0.2 mm, and a protruding length of a longest protrusion part is not greater than the thickness of the lower sheet 3.

In the welded member in accordance with an aspect of the present invention, it is preferable that the protrusion part of the weld bead 2 satisfies the above condition at any position in the direction in which the weld bead 2 extends.

(Type of Hot Dip Zn-Based Alloy Coated Steel Sheet)

In the welded member 10 in accordance with an aspect of the present invention, the hot dip Zn-based alloy coated steel sheet is a hot dip coated steel sheet whose coating layer contains Zn as a main component. Such a hot dip coated steel sheet can be a hot dip Zn coated steel sheet, an alloyed hot dip Zn coated steel sheet, a hot dip Zn—Al coated steel sheet, a hot dip Zn—Al—Mg alloy coated steel sheet, or the like.

In the hot dip Zn-based alloy coated steel sheet, it is possible that the Zn-based coating layer 4 contains Zn as a main component and contains Al in an amount of not less than 1.0% by mass and not more than 22.0% by mass. According to the welded member 10 in accordance with the present embodiment, the shear strength of the weld bead 2 is excellent even in a case where the Al concentration in the Zn-based coating layer 4 is not less than 1% by mass, i.e., the Al concentration is high. This is because, even if generation of blowholes B increases to some extent due to a change in behavior of the coating layer in welding, the weld bead 2 has the blowhole occupancy Br of not more than 50% and satisfies the above formula (1), and this makes it possible to prevent deterioration in shear strength.

Among the hot dip Zn-based alloy coated steel sheets, the hot dip Zn—Al—Mg alloy coated steel sheet is preferable because the hot dip Zn—Al—Mg alloy coated steel sheet contains Al: 1.0% by mass to 22.0% by mass and Mg: 0.05% by mass to 10.0% by mass, and therefore excellent corrosion resistance is achieved. In this case, it is possible to obtain the welded member which is excellent in corrosion resistance and in shear strength of the welded part.

In addition, in order to inhibit generation and growth of a $Zn_{11}Mg_2$ system phase which causes deterioration in coating layer appearance and in corrosion resistance, the coating layer of the hot dip Zn—Al—Mg alloy coated steel sheet preferably contains Ti: 0.002% by mass to 0.1% by mass or B: 0.001% by mass to 0.05% by mass.

The coating layer of the hot dip Zn—Al—Mg alloy coated steel sheet may contain Si in an amount of not more than 2.0% by mass in order to inhibit excessive growth of an Fe—Al alloy layer generated in an interface between a base steel sheet surface and the coating layer and to improve adherence of the coating layer in processing.

The coating layer of the hot dip Zn—Al—Mg alloy coated steel sheet can contain Fe in an amount of not more than 2.5% by mass.

The above feature can be expressed as follows. That is, the coating layer of the hot dip Zn—Al—Mg alloy coated steel sheet preferably satisfies one or more conditions selected from the group consisting of: Ti: 0.002% by mass to 0.1% by mass, B: 0.001% by mass to 0.05% by mass, Si: 0% by mass to 2.0% by mass, and Fe: 0% by mass to 2.5% by mass.

(Sheet Thickness of Hot Dip Zn-Based Alloy Coated Steel Sheet)

According to the welded member 10 in accordance with an aspect of the present invention, the sheet thickness (thickness) of the hot dip Zn-based alloy coated steel sheet is not particularly limited. The sheet thickness is appropriately selected according to a purpose of use of the welded member 10.

[Manufacturing Method of Welded Member]

The welded member 10 in accordance with an embodiment of the present invention can be manufactured, for example, using a pulsed arc welding process. The following description will discuss a method for manufacturing the welded member 10 in accordance with the present embodiment with reference to FIG. 3 and FIG. 4.

Figure 3:
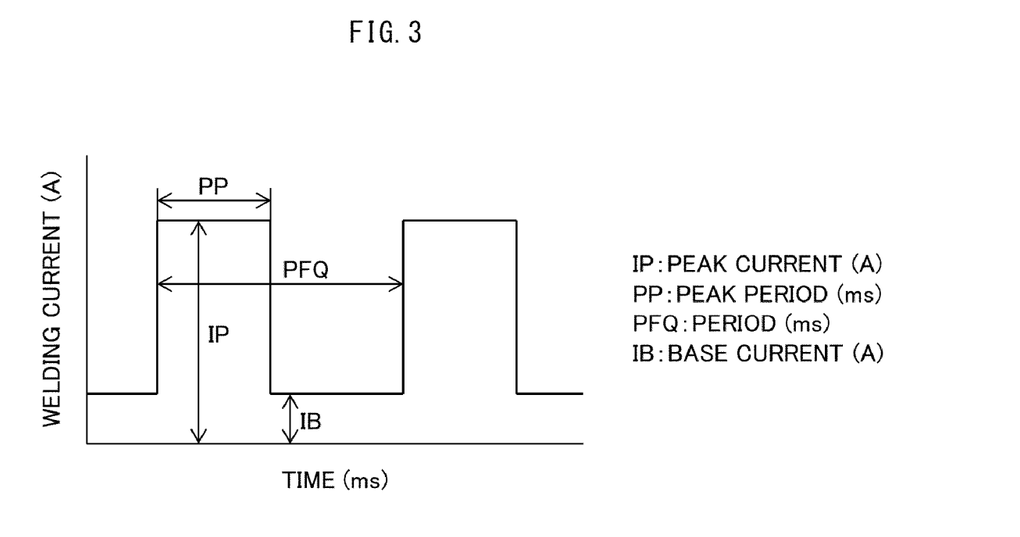
FIG. 3 is a view schematically showing a pulsed current waveform in a pulsed arc welding process.
Figure 4:
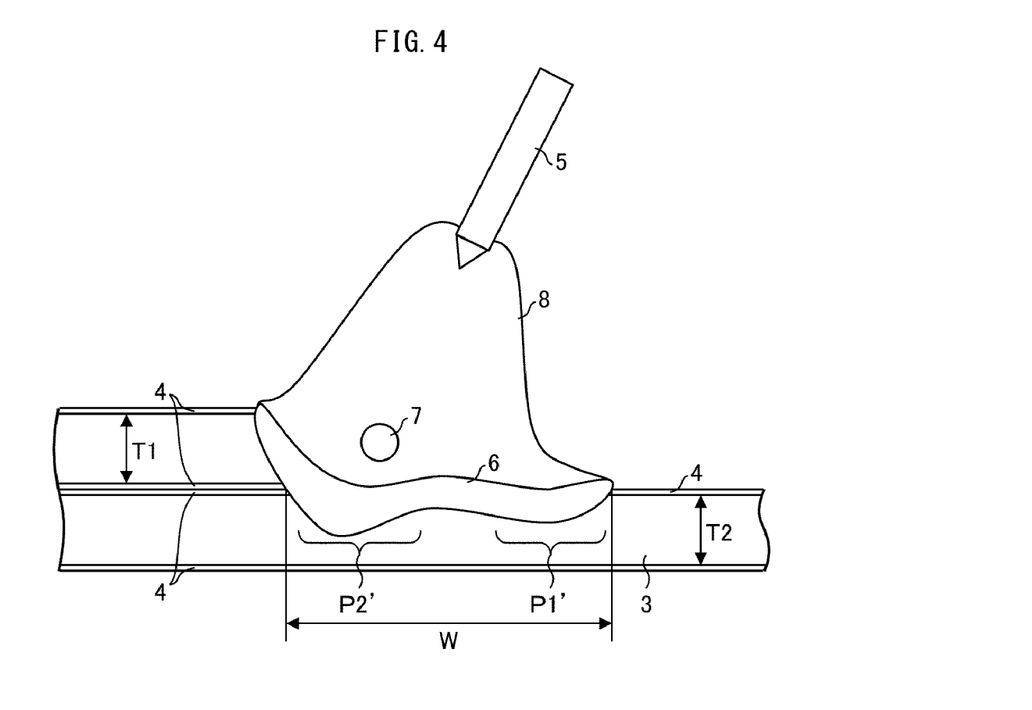
FIG. 4 is a cross-sectional view schematically illustrating a state in the vicinity of a welded part in pulsed arc welding.

FIG. 3 is a view schematically showing a pulsed current waveform in a pulsed arc welding process. FIG. 4 is a cross-sectional view schematically illustrating a state in the vicinity of a welded part in pulsed arc welding.

As shown in FIG. 3, the pulsed arc welding process is an arc welding process in which a peak current IP and a base current IB are alternately and repeatedly supplied, and the peak current IP is set to be equal to or higher than a critical current at which transfer of a small droplet, that is, spray transfer is carried out. A time period during which the peak current IP is supplied is defined as a peak period PP, and a pulse period of a pulsed current constituted by the peak current IP and the base current IB is defined as a period PFQ.

As illustrated in FIG. 4, in a case where a distance from a tip of a welding wire 5 to a molten pool 6, i.e., an arc length is lengthened and the peak current IP is set to be equal to or higher than the critical current, an effect of narrowing a droplet of the tip of the wire (i.e., an electromagnetic pinch effect) is caused by electromagnetic force. This electromagnetic pinch effect causes the droplet of the tip of the welding wire 5 to be constricted, and thus the droplet is granulated and regular transfer of the droplet (i.e., spray transfer) is carried out for each pulse period. As a result, the droplet is smoothly transferred to the molten pool 6.

According to such a pulsed arc welding process, since the arc length is long, an arc 8 expands and a width of the molten pool 6 increases, and this makes it easy to form, by solidifying the molten pool 6, the weld bead 2 which has the cross-sectional width W falling within a range represented by the formula (1) below (welding step).

$$2T \leq W \leq 6T \tag{1}$$

In addition, the pulsed arc welding process can inhibit generation of blowholes by promoting discharge of Zn vapor, so that the blowhole occupancy Br can be reduced. Therefore, in a case where hot dip Zn-based alloy coated steel materials having a coating weight of 15 $g/m^2$ to 250 $g/m^2$ per surface are arc-welded together by using the pulsed arc welding process, it is possible to prevent deterioration in shear strength of the weld bead 2 by forming the weld bead 2 such that the above formula (1) is satisfied and the blowhole occupancy Br becomes not more than 50%.

In addition, various conditions of the pulsed arc welding process are controlled to form, in the molten pool 6, a deep penetration part P1' made by arc heat and a deep penetration part P2' made by spray transfer of a droplet 7. The deep penetration parts P1' and P2' respectively become protrusion parts P1 and P2 of the weld bead 2 after solidification of the molten pool 6, and the shear strength of the welded member 10 is enhanced by the anchor effect.

In the present embodiment, the pulsed arc welding conditions are not particularly limited, provided that the welded member 10 in accordance with the present embodiment can be obtained. The pulsed arc welding conditions such as the arc length, the peak current IP, the period PFQ, and the peak period PP can be appropriately selected.

In the pulsed arc welding process in accordance with the present embodiment, an Ar—$CO_2$ gas is used as a shielding gas for spray transfer of the droplet. The $CO_2$ concentration is preferably not less than 1% by volume and not more than 30% by volume, more preferably not less than 5% by volume and not more than 20% by volume. If the $CO_2$ concentration is excessively high, spray transfer of the droplet becomes difficult. On the other hand, if the $CO_2$ concentration is excessively low, the arc 8 expands and the cross-sectional width W may become larger than necessary.

In the pulsed arc welding process in accordance with the present embodiment, various solid wires defined in JIS Z3312 are used as the welding wire. For example, JIS Z3312 YGW12 can be used. A wire diameter of the welding wire can be, for example, 1.2 mm. It is possible to use a welding wire having a wire diameter ranging from 0.8 mm to 1.6 mm.

Note that, according to an ordinary arc welding process, droplet transfer is short circuiting transfer and an arc length is short. Therefore, it is difficult to widen the cross-sectional width W of the weld bead 2 to the range specified in an aspect of the present invention. If a welding current or a welding voltage is increased to widen the cross-sectional width W, a penetration bead or burn-through occurs. In addition, in the ordinary arc welding process, only one protrusion part of the weld bead 2 is formed in the lower sheet 3, and the anchor effect is low.

[Recap]

As above described, according to the welded member in accordance with an aspect of the present invention, it is preferable that the weld bead has a protrusion part which protrudes into the first hot dip Zn-based alloy coated steel sheet in the cross section obtained by cutting the weld bead by a plane orthogonal to the direction in which the weld bead extends, a protruding length of the protrusion part in the first hot dip Zn-based alloy coated steel sheet being not less than 0.2 mm, and the protruding length being not greater than a thickness of the first hot dip Zn-based alloy coated steel sheet.

According to the welded member in accordance with an aspect of the present invention, it is possible that the Zn-based coating layer of each of the first hot dip Zn-based alloy coated steel sheet and the second hot dip Zn-based alloy coated steel sheet contains Zn as a main component, the Zn-based coating layer containing Al in an amount of not less than 1.0% by mass and not more than 22.0% by mass.

Further, according to the welded member in accordance with an aspect of the present invention, it is preferable that the Zn-based coating layer of each of the first hot dip Zn-based alloy coated steel sheet and the second hot dip Zn-based alloy coated steel sheet contains Mg in an amount of not less than 0.05% by mass and not more than 10.0% by mass.

Further, according to the welded member in accordance with an aspect of the present invention, it is preferable that a composition of the Zn-based coating layer of each of the first hot dip Zn-based alloy coated steel sheet and the second hot dip Zn-based alloy coated steel sheet satisfies one or more conditions selected from the group consisting of: Ti: 0.002% by mass to 0.1% by mass, B: 0.001% by mass to 0.05% by mass, Si: 0% by mass to 2.0% by mass, and Fe: 0% by mass to 2.5% by mass.

According to the manufacturing method of the welded member in accordance with an aspect of the present invention, it is possible that the Zn-based coating layer of each of the first hot dip Zn-based alloy coated steel sheet and the second hot dip Zn-based alloy coated steel sheet contains Zn as a main component, the Zn-based coating layer containing Al in an amount of not less than 1.0% by mass and not more than 22.0% by mass.

Moreover, according to the manufacturing method of the welded member in accordance with an aspect of the present invention, it is preferable that the Zn-based coating layer of each of the first hot dip Zn-based alloy coated steel sheet and the second hot dip Zn-based alloy coated steel sheet contains Mg in an amount of not less than 0.05% by mass and not more than 10.0% by mass.

Moreover, according to the manufacturing method of the welded member in accordance with an aspect of the present invention, it is preferable that a composition of the Zn-based coating layer of each of the first hot dip Zn-based alloy coated steel sheet and the second hot dip Zn-based alloy coated steel sheet satisfies one or more conditions selected from the group consisting of: Ti: 0.002% by mass to 0.1% by mass, B: 0.001% by mass to 0.05% by mass, Si: 0% by mass to 2.0% by mass, and Fe: 0% by mass to 2.5% by mass.

The present invention is not limited to the embodiment, but can be altered by a skilled person in the art within the scope of the claims. The present invention also encompasses in its technical scope any embodiment based on an appropriate combination of the technical means disclosed in different embodiments.

EXAMPLES

The welded member 10 in accordance with an aspect of the present invention will be described below in more detail with reference to Examples and Comparative Examples. Note, however, that the present invention is not limited to such Examples.

First Example

Fillet welding with a lap joint was carried out by a pulsed arc welding process or an ordinary arc welding process with use of, as each of an upper sheet and a lower sheet, a hot dip Zn—Al(6% by mass)-Mg(3% by mass) coated steel sheet having a sheet thickness of 2.3 mm, a width of 100 mm, and a length of 100 mm. As a welding wire, JIS Z3312 YGW12 having a diameter of 1.2 mm was used, and an overlap width of the lap joint was 30 mm.

X-ray radiography was carried out with respect to each of samples (hereinafter referred to as "welded sample") after the lap fillet welding, and a blowhole occupancy was measured. After the X-ray radiography, a tensile test piece having a width of 50 mm was taken out from a central part of each of the welded samples. The tensile test piece was subjected to tensile test by applying a tensile load P in a direction in which the weld bead is sheared, and a breakage location was investigated. The tensile test was carried out at a tensile speed of 3 mm/min.

In addition, a sample for observing a cross section was taken out from the immediate vicinity of the part from which the tensile test piece was taken, and the sample thus taken was microscopically observed to investigate a cross-sectional width W of the weld bead and a protruding length of the protrusion part. The investigation results are shown in Table 1.

be seen that the present invention can provide the welded member which is excellent in shear strength of the weld bead.

In contrast, in Comparative Example No. 2 using the ordinary arc welding process, the cross-sectional width W of the weld bead was less than the range specified in an aspect of the present invention and, as a result of the tensile test, the weld bead broke. The breaking load was 12 kN. Comparative Example No. 2 shows that, even in a case where the coating weight is relatively small, i.e., 45 g/m$^2$ and the blowhole occupancy is relatively small, i.e., 15%, the shear strength of the weld bead is deteriorated and the weld bead breaks as long as the cross-sectional width of the weld bead is small.

In addition, in Comparative Example No. 3, the cross-sectional width W of the weld bead could be made larger than that of Comparative Example No. 2 by carrying out the ordinary arc welding while setting the welding current and the welding voltage to be greater than those in Comparative Example No. 2. However, the protruding length of the protrusion part and the blowhole occupancy increased. In Comparative Example No. 3, the cross-sectional width W of the weld bead satisfied the above formula (1), but the blowhole occupancy was high, i.e., 78%, and thus fell outside the range specified in an aspect of the present invention. Therefore, as a result of the tensile test, the weld bead broke. The breaking load was 16 kN.

In a case where the arc welding is carried out with use of the ordinary arc welding process with respect to a hot dip Zn-based alloy coated steel sheet having a large coating weight, i.e., 190 g/m$^2$ while increasing the welding current

TABLE 1

| No. | Coating amount (g/m$^2$) | Sheet thickness (Upper sheet/Lower sheet) (mm) | Welding method | Welding current (A) | Welding voltage (V) | Welding speed (m/min) | Cross-sectional width W of weld bead (mm) | Protruding length of protrusion part (mm) | Blow hole occu-pancy (%) | Tensile test result Breakage location | Breaking bad (kN) | Category |
|---|---|---|---|---|---|---|---|---|---|---|---|---|
| 1 | 190 | 2.3/2.3 | Pulsed arc welding | 180 | 24 | 0.4 | 9.2 | 0.8 | 45 | Lower sheet (base material) broke | 51 | Example |
| 2 | 45 | 2.3/2.3 | Ordinary arc welding | 160 | 16 | 0.4 | 3.7 | 0.1 | 15 | Weld bead broke | 12 | Comparative Example |
| 3 | 190 | 2.3/2.3 | Ordinary arc welding | 180 | 32 | 0.4 | 5.9 | 2.3 | 78 | Weld bead broke | 16 | Comparative Example |

Here, a welding current and a welding voltage in the pulsed arc welding process in Example No. 1 are integral values of a peak value and a base value, respectively. A protruding length of a protrusion part in Example No. 1 is a protruding length of a shorter protrusion part out of two protrusion parts. In Comparative Examples No. 2 and No. 3, only one protrusion part was formed. A coating weight in Table 1 indicates a coating weight per surface.

As shown in Table 1, in Example No. 1 using the pulsed arc welding process, the coating weight per surface of the hot dip Zn-based alloy coated steel sheet, the cross-sectional width W of the weld bead, and the blowhole occupancy Br were within the range specified in an aspect of the present invention and, as a result of the tensile test, the lower sheet (base material) broke. The breaking load was 54 kN. It can and the welding voltage, the following can be said from Comparative Example No. 3. That is, in that case, even though the cross-sectional width W could be increased, the blowhole occupancy Br was greatly increased (over 50%) because blowholes were easily generated and, as a result of the tensile test, it was found that the weld bead 2 broke. Moreover, in that case, it was also found that the protruding length of the protrusion part was lengthened and a penetration bead was generated.

Figure 5:
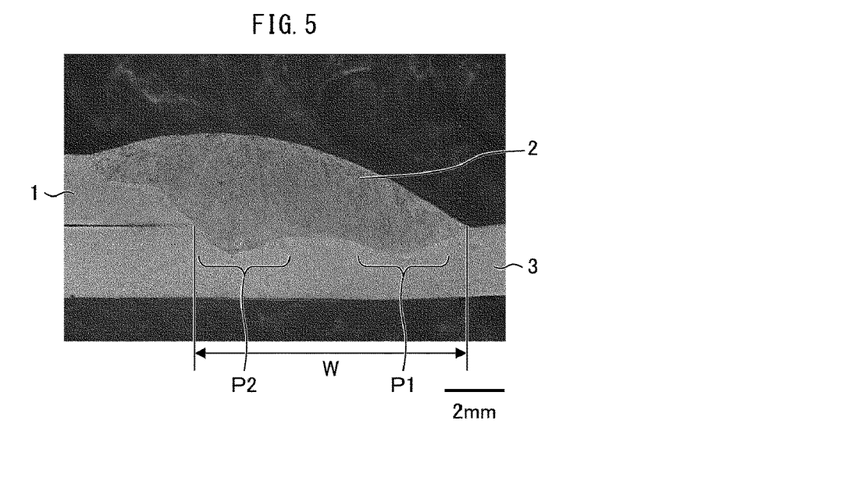
FIG. 5 is an optical photomicrograph showing a cross section of a welded member in accordance with an embodiment of the present invention.
Figure 6:
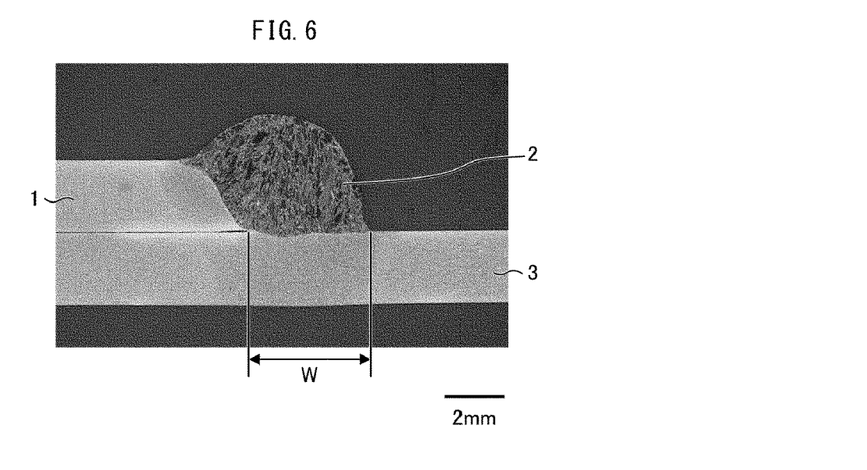
FIG. 6 is an optical photomicrograph showing a cross section of a welded member prepared using a standard arc welding process.
Figure 7:
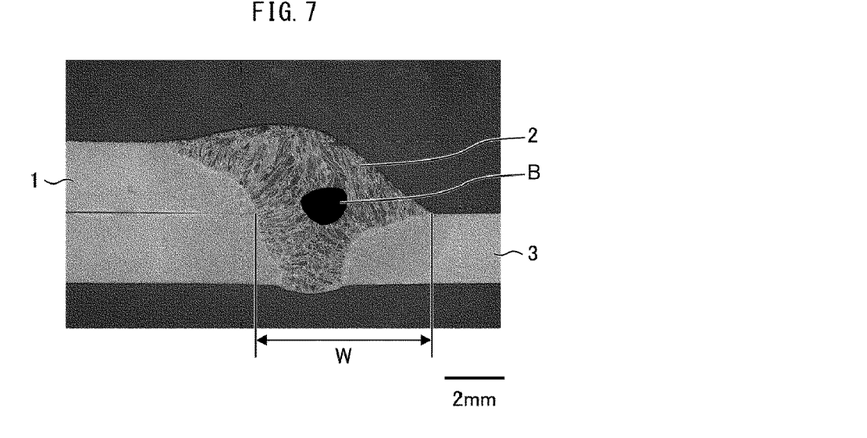
FIG. 7 is an optical photomicrograph showing a cross section of a welded member prepared using a standard arc welding process.

The following description further explains the above Example No. 1 and Comparative Examples No. 2 and No. 3 with reference to FIGS. 5 through 7. FIG. 5 is an optical photomicrograph showing a cross section in the vicinity of the welded part in Example No. 1. FIG. 6 is an optical photomicrograph showing a cross section in the vicinity of the welded part in Comparative Example No. 2. FIG. 7 is an optical photomicrograph showing a cross section in the vicinity of the welded part in Comparative Example No. 3.

As shown in FIG. 5, in Example No. 1, the cross-sectional width W of the weld bead was 9.2 mm and the blowhole occupancy Br was 45%. Thus, the cross-sectional width W and the blowhole occupancy Br fell within the range specified in an aspect of the present invention, so that the cross-sectional area of the shear plane S was secured. Therefore, the welded member in Example No. 1 is excellent in shear strength of the weld bead 2. In addition, two protrusion parts (P1, P2) of the weld bead were formed in the lower sheet 3, and the depth of the protrusion part P1 which was the shorter protrusion part was deep, i.e., 0.8 mm. From this, the anchor effect is increased and the shear strength of the weld bead 2 is more excellent.

On the other hand, as shown in FIG. 6, in Comparative Example No. 2, the cross-sectional width W of the weld bead 2 was narrow, i.e., 3.7 mm. Although the blowhole occupancy was low, i.e., 15%, the cross-sectional area of the shear plane S could not be sufficiently secured in Comparative Example No. 2. The depth of the protrusion part was 0.1 mm, that is, the penetration was shallow.

As shown in FIG. 7, in Comparative Example No. 3 in which the hot dip Zn-based alloy coated steel sheet whose coating weight was large, i.e., 190 g/m² was used and the welding current and the welding voltage were made greater than those of No. 2, the cross-sectional width W of the weld bead 2 was large, i.e., 5.9 mm, which was within the above formula (1). However, a large amount of blowholes B were generated, and the blowhole occupancy Br was out of the range specified in an aspect of the present invention. In addition, the weld bead 2 melted to the back surface of the lower sheet 3 in welding, and a penetration bead was generated.

Second Example

Next, fillet welding with a lap joint was carried out by the pulsed arc welding process using each of hot dip Zn-based alloy coated steel sheets having various coating layer compositions, and thus welded samples were prepared. Pulsed arc welding conditions are shown in Table 2.

TABLE 2

| Welding wire | 1.2 mm φ, JIS Z3312 YGW 12 |
|---|---|
| Welding speed (m/min) | 0.4 |
| Shielding gas | Ar-(5~20% by volume)$CO_2$ |
| Welding current (A) | 140~220 |
| Welding voltage (V) | 20~30 |
| Peak current (A) | 350~600 |
| Period (ms) | 1~20 |
| Arc length | 2~20 |

Here, a welding current and a welding voltage under the pulsed arc welding conditions indicated in Table 2 are integral values of a peak value and a base value, respectively.

The weld bead cross-sectional width W, the blowhole occupancy Br, and the shear strength of the welded samples were investigated in a manner similar to that in the above First Example. Results of the measurement are shown in Table 3.

TABLE 3

| No. | Type of hotdip Zn-based alby coated steel sheet | Coating layer composition (% by mass) | | | | | | Coating amount (g/m²) | Sheet thickness (Upper sheet/ Lower sheet) (mm) |
|---|---|---|---|---|---|---|---|---|---|
| | | Al | Mg | Ti | B | Si | Fe | | |
| 4 | Hotdip Zn coated steel sheet | 0.2 | — | — | — | — | — | 190 | 1.6/1.6 |
| 5 | Albyed hotdip Zn coated steel sheet | — | — | — | — | — | 9.8 | 60 | 2.3/2.3 |
| 6 | Hotdip Zn—Al coated steel sheet | 54.5 | — | — | — | 1.8 | — | 120 | 3.2/3.2 |
| 7 | | 1.2 | — | — | — | — | — | 90 | 4.5/4.5 |
| 8 | | 21.7 | — | — | — | — | — | 120 | 6.0/6.0 |
| 9 | Hotdip Zn—Al—M galby coated steel sheet | 1.3 | 0.05 | — | — | — | — | 150 | 1.6/2.3 |
| 10 | | 21.7 | 9.7 | — | — | — | — | 190 | 2.3/3.2 |
| 11 | | 6.1 | 2.9 | 0.002 | 0.001 | — | — | 250 | 3.2/4.5 |
| 12 | | 5.9 | 3.1 | 0.035 | 0.02 | 0.055 | 0.02 | 15 | 4.5/6.0 |
| 13 | | | | | | | | 90 | 2.3/1.6 |
| 14 | | | | | | | | 190 | 3.2/2.3 |
| 15 | | | | | | | | 250 | 4.5/3.2 |
| 16 | | 6.0 | 6.2 | 0.1 | 0.05 | 2.0 | 2.5 | 250 | 6.0/4.5 |
| 17 | | 5.8 | 3.0 | 0.1 | 0.05 | 1.8 | 2.5 | 90 | 1.6/1.6 |
| 18 | Hotdip Zn coated steel sheet | 0.2 | — | — | — | — | — | 15 | 1.6/1.6 |
| 19 | Hotdip Zn—Al coated steel sheet | 1.1 | — | — | — | — | — | 45 | 2.3/2.3 |
| 20 | | 22.0 | — | — | — | — | — | 190 | 4.5/4.5 |
| 21 | Hotdip Zn—Al—M galby coated steel sheet | 1.1 | 0.05 | — | — | — | — | 250 | 6.0/6.0 |
| 22 | | 22.0 | 9.8 | — | — | — | — | 60 | 1.6/2.3 |
| 23 | | 5.8 | 3.3 | 0.002 | 0.005 | — | — | 90 | 2.3/3.2 |
| 24 | | 6.0 | 2.8 | 0.002 | 0.001 | — | — | 265 | 3.2/4.5 |
| 25 | | 6.1 | 3.0 | 0.025 | 0.01 | 0.025 | 0.002 | 300 | 4.5/6.0 |

TABLE 3-continued

| No. | Cross-sectional width W of weld bead (mm) | Protruding length of protrusion part (mm) | Blow hole occupancy (%) | Tensile test result | Category |
|---|---|---|---|---|---|
| 4 | 3.7 | 0.3 | 46 | Upper sheet (base material) broke | Example |
| 5 | 6.4 | 0.5 | 12 | Upper sheet (base material) broke | |
| 6 | 12.8 | 0.6 | 44 | Lower sheet (base material) broke | |
| 7 | 22.5 | 1.2 | 23 | Lower sheet (base material) broke | |
| 8 | 35.0 | 2.3 | 29 | Upper sheet (base material) broke | |
| 9 | 4.1 | 0.5 | 33 | Upper sheet (base material) broke | |
| 10 | 11.5 | 2.3 | 41 | Upper sheet (base material) broke | |
| 11 | 16.0 | 4.0 | 47 | Upper sheet (base material) broke | |
| 12 | 26.5 | 5.3 | 3 | Upper sheet (base material) broke | |
| 13 | 8.0 | 1.4 | 18 | Lower sheet (base material) broke | |
| 14 | 6.9 | 1.6 | 35 | Lower sheet (base material) broke | |
| 15 | 18.8 | 1.8 | 45 | Lower sheet (base material) broke | |
| 16 | 26.0 | 3.3 | 46 | Lower sheet (base material) broke | |
| 17 | 4.8 | 2.3 | 26 | Lower sheet (base material) broke | |
| 18 | 1.6 | 0.1 | 15 | Weld bead broke | Comparative Example |
| 19 | 4.0 | 0.1 | 23 | Weld bead broke | |
| 20 | 6.7 | 0.1 | 45 | Weld bead broke | |
| 21 | 36.1 | 0.05 | 52 | Weld bead broke | |
| 22 | 2.4 | 0.4 | 33 | Weld bead broke | |
| 23 | 3.8 | 0.5 | 38 | Weld bead broke | |
| 24 | 9.6 | 1.3 | 59 | Weld bead broke | |
| 25 | 22.1 | 2.1 | 87 | Weld bead broke | |

Here, for each of Nos. 4 through 16 and 18 through 25, the protruding length of the protrusion part shown in Table 3 indicates a protruding length of a shorter protrusion part. For No. 17, the protruding length of the protrusion part shown in Table 3 indicates a protruding length of a longer protrusion part.

Note that the cross-sectional width of the weld bead and the protruding length of the protrusion part in each of the welded samples can be adjusted by changing various welding conditions within the ranges shown in Table 2. Here, the cross-sectional width and the protruding length of the welded sample obtained by pulsed arc welding under certain welding conditions may vary depending on various conditions such as a type of hot dip Zn-based alloy coated steel sheet (base material composition, coating layer composition), a coating weight, a sheet thickness, and characteristics of an arc-welding device.

For example, in Example No. 5 in which both the upper sheet and the lower sheet were alloyed hot dip Zn coated steel sheets having a coating weight of 60 g/m² and having a sheet thickness of 2.3 mm, the pulsed arc welding was carried out under the following welding conditions. That is, the pulsed arc welding was carried out under welding conditions: the welding current was 160 A, the welding voltage was 20 V, and the shielding gas contained Ar and 10% by volume of $CO_2$. In that case, as shown in Table 3, the cross-sectional width of the weld bead was 6.4 mm, the protruding length of the protrusion part was 0.5 mm, and the blowhole occupancy was 12%.

One of factors affecting the cross-sectional width and the protruding length in the welded sample is heat input in welding. For example, in the case of Example No. 5, the heat input can be expressed as follows:

Heat input=(160 $A$×20 $V$)÷(40 cm/60 $s$)=4800 (J/cm)

Here, in order to uniformalize the units, the welding speed of 0.4 m/min is expressed as (40 cm/60 s).

As such, for example, in the case of the sheet as in Example No. 5 (thickness was 2.3 mm), the welding conditions were set so that the heat input fell within the range: heat input ≥4800 (J/cm). From this, the cross-sectional width of the weld bead could be set to 6.4 mm or more and the protruding length of the protrusion part could be set to 0.5 mm or more, and this made it possible to obtain the welded member which was excellent in shear strength of the weld bead. However, it will be understood that excessively high heat input results in excessively large cross-sectional width and in excessive protrusion. A preferred heat input range varies depending on a sheet thickness. The preferred heat input range tends to become lower as the sheet thickness decreases, and the preferred heat input range tends to become higher as the sheet thickness increases.

In manufacturing the welded members of Examples, the welding conditions may be appropriately set within the range indicated in the above Table 2 so that the cross-sectional width of the weld bead and the protruding length of the protrusion part fall within the range specified in an aspect of the present invention. Such welding conditions can be set, for example, by carrying out a preliminary experiment and adjusting welding conditions according to the result.

As shown in Table 3, in Examples No. 4 through No. 17, the coating weight per surface of the hot dip Zn-based alloy coated steel sheet, the cross-sectional width W of the weld bead, and the blowhole occupancy Br were within the range specified in an aspect of the present invention. Further, as a result of the tensile test, the base material (i.e., the upper sheet or the lower sheet) broke in each of Examples No. 4 through No. 17, and thus showed excellent shear strength.

In Example No. 17, the protruding length of the protrusion part exceeded the thickness of the lower sheet due to excessive penetration, and a penetration bead was generated. In this case, depending on quality requested as a product, it is necessary to grind the penetration bead.

On the other hand, in Comparative Examples No. 18 through No. 25 in which at least one of the coating weight per surface of the hot dip Zn-based alloy coated steel sheet, the cross-sectional width W of the weld bead, and the blowhole occupancy Br is out of the range specified in an aspect of the present invention, the weld bead broke as a result of the tensile test, and it was thus found that the shear strength of the weld bead was deteriorated.

REFERENCE SIGNS LIST

1: Upper sheet (second hot dip Zn-based alloy coated steel sheet)
2: Weld bead
3: Lower sheet (first hot dip Zn-based alloy coated steel sheet)
4: Zn-based coating layer
10: Welded member
B: Blowhole
P1, P2: Protrusion part
S: Shear plane
W: Cross-sectional width

The invention claimed is:

1. A welded member comprising:
a first hot dip Zn-based alloy coated steel sheet;
a second hot dip Zn-based alloy coated steel sheet stacked on and arc-welded to a first sheet surface of the first hot dip Zn-based alloy coated steel sheet; and
a weld bead that is provided on the first sheet surface such that the first hot dip Zn-based alloy coated steel sheet and the second hot dip Zn-based alloy coated steel sheet are welded together by the weld bead,
each of the first hot dip Zn-based alloy coated steel sheet and the second hot dip Zn-based alloy coated steel sheet having a coating weight of 15 g/m² to 250 g/m² per surface,
the weld bead being formed such that a cross-sectional width W satisfies a formula (1) below and a blowhole occupancy Br represented by a formula (2) below becomes not more than 50%, the cross-sectional width W being a width of a cross section from one boundary between a Zn-based coating layer and the weld bead to the other boundary between the Zn-based coating layer and the weld bead on the first sheet surface, and the cross section being obtained by cutting the weld bead by a plane orthogonal to a direction in which the weld bead extends, the weld bead having at least two protrusion parts each of which protrudes into the first hot dip Zn-based alloy coated steel sheet in the cross section,
a protruding length of each of the at least two protrusion parts in the first hot dip Zn-based alloy coated steel sheet being not less than 0.2 mm, and the protruding length being not greater than a thickness of the first hot dip Zn-based alloy coated steel sheet, and
the first sheet surface being in contact with a second sheet surface of the second hot dip Zn-based alloy coated steel sheet, $$2T \leq W \leq 6T \quad (1)$$

$$Br = (\Sigma di/L) \times 100 \quad (2)$$

where:
T represents a thickness of any of the first hot dip Zn-based alloy coated steel sheet and the second hot dip Zn-based alloy coated steel sheet and, in a case where a thickness of the first hot dip Zn-based alloy coated steel sheet is different from a thickness of the second hot dip Zn-based alloy coated steel sheet, T represents a smaller one of the thickness of the first hot dip Zn-based alloy coated steel sheet and the thickness of the second hot dip Zn-based alloy coated steel sheet;
di represents a length of an i-th blowhole observed in X-ray radiography; and
L represents a length of the weld bead.

2. The welded member as set forth in claim 1, wherein:
the Zn-based coating layer of each of the first hot dip Zn-based alloy coated steel sheet and the second hot dip Zn-based alloy coated steel sheet contains Zn as a main component, the Zn-based coating layer containing Al in an amount of not less than 1.0% by mass and not more than 22.0% by mass.

3. The welded member as set forth in claim 2, wherein:
the Zn-based coating layer of each of the first hot dip Zn-based alloy coated steel sheet and the second hot dip Zn-based alloy coated steel sheet contains Mg in an amount of not less than 0.05% by mass and not more than 10.0% by mass.

4. The welded member as set forth in claim 3, wherein:
a composition of the Zn-based coating layer of each of the first hot dip Zn-based alloy coated steel sheet and the second hot dip Zn-based alloy coated steel sheet satisfies one or more conditions selected from the group consisting of: Ti: 0.002% by mass to 0.1% by mass, B: 0.001% by mass to 0.05% by mass, Si: 0% by mass to 2.0% by mass, and Fe: 0% by mass to 2.5% by mass.

5. A method for manufacturing a welded member by a pulsed arc welding process in which a second hot dip Zn-based alloy coated steel sheet that is stacked on a first sheet surface of a first hot dip Zn-based alloy coated steel sheet is arc-welded to the first hot dip Zn-based alloy coated steel sheet with an arc generated by alternately supplying a peak current and a base current, said method comprising:
a welding step of forming a weld bead on the first sheet surface such that the first hot dip Zn-based alloy coated steel sheet and the second hot dip Zn-based alloy coated steel sheet are welded together by the weld bead,
each of the first hot dip Zn-based alloy coated steel sheet and the second hot dip Zn-based alloy coated steel sheet having a coating weight of 15 g/m² to 250 g/m² per surface,
in the welding step, the pulsed arc welding process being carried out by using, as a shielding gas, an Ar—$CO_2$ gas whose $CO_2$ concentration is not less than 5% by volume and not more than 20% by volume, in the welding step,
(i) the weld bead being formed such that a cross-sectional width W satisfies a formula (1) below and a blowhole occupancy Br represented by a formula (2) below becomes not more than 50%, the cross-sectional width W being a width of a cross section from one boundary between a Zn-based coating layer and the weld bead to the other boundary between the Zn-based coating layer and the weld bead on the first sheet surface, and the cross section being obtained by cutting the weld bead by a plane orthogonal to a direction in which the weld bead extends,
(ii) the arc welding being carried out such that a blowhole occupancy Br represented by a formula (2) below becomes not more than 50%, and
(iii) the weld bead being formed such that the weld bead has a protrusion part which protrudes into the first hot dip Zn-based alloy coated steel sheet in the cross section, a protruding length of the protrusion part in the first hot dip Zn-based alloy coated steel sheet being not less than 0.2 mm, and the protruding length being not greater than a thickness of the first hot dip Zn-based alloy coated steel sheet, and
in the welding step, a solid wire being used as a welding wire, $$2T \leq W \leq 6T \quad (1)$$

$$Br=(\Sigma di/L) \times 100 \quad (2)$$

where:
T represents a thickness of any of the first hot dip Zn-based alloy coated steel sheet and the second hot dip Zn-based alloy coated steel sheet and, in a case where a thickness of the first hot dip Zn-based alloy coated steel sheet is different from a thickness of the second hot dip Zn-based alloy coated steel sheet, T represents a smaller one of the thickness of the first hot dip Zn-based alloy coated steel sheet and the thickness of the second hot dip Zn-based alloy coated steel sheet;
di represents a length of an i-th blowhole observed in X-ray radiography; and
L represents a length of the weld bead.

6. The method as set forth in claim 5, wherein:
the Zn-based coating layer of each of the first hot dip Zn-based alloy coated steel sheet and the second hot dip Zn-based alloy coated steel sheet contains Zn as a main component, the Zn-based coating layer containing Al in an amount of not less than 1.0% by mass and not more than 22.0% by mass.

7. The method as set forth in claim 6, wherein:
the Zn-based coating layer of each of the first hot dip Zn-based alloy coated steel sheet and the second hot dip Zn-based alloy coated steel sheet contains Mg in an amount of not less than 0.05% by mass and not more than 10.0% by mass.

8. The method as set forth in claim 7, wherein:
a composition of the Zn-based coating layer of each of the first hot dip Zn-based alloy coated steel sheet and the second hot dip Zn-based alloy coated steel sheet satisfies one or more conditions selected from the group consisting of: Ti: 0.002% by mass to 0.1% by mass, B: 0.001% by mass to 0.05% by mass, Si: 0% by mass to 2.0% by mass, and Fe: 0% by mass to 2.5% by mass.

9. The method as set forth in claim 5, wherein:
in the welding step, the weld bead being formed such that the weld bead has at least two protrusion parts in the cross section, each of the at least two protrusion parts being said protrusion part.

10. The method as set forth in claim 9, wherein:
the Zn-based coating layer of each of the first hot dip Zn-based alloy coated steel sheet and the second hot dip Zn-based alloy coated steel sheet contains Zn as a main component, the Zn-based coating layer containing Al in an amount of not less than 1.0% by mass and not more than 22.0% by mass.

11. The method as set forth in claim 10, wherein:
the Zn-based coating layer of each of the first hot dip Zn-based alloy coated steel sheet and the second hot dip Zn-based alloy coated steel sheet contains Mg in an amount of not less than 0.05% by mass and not more than 10.0% by mass.

12. The method as set forth in claim 11, wherein:
a composition of the Zn-based coating layer of each of the first hot dip Zn-based alloy coated steel sheet and the second hot dip Zn-based alloy coated steel sheet satisfies one or more conditions selected from the group consisting of: Ti: 0.002% by mass to 0.1% by mass, B: 0.001% by mass to 0.05% by mass, Si: 0% by mass to 2.0% by mass, and Fe: 0% by mass to 2.5% by mass.

* * * * *

UNITED STATES PATENT AND TRADEMARK OFFICE
CERTIFICATE OF CORRECTION

PATENT NO.         : 10,975,899 B2
APPLICATION NO.    : 16/344435
DATED              : April 13, 2021
INVENTOR(S)        : Kazuaki Hosomi et al.

It is certified that error appears in the above-identified patent and that said Letters Patent is hereby corrected as shown below:

In the Claims

Claim 5, Column 21, Lines 2-12, should read:
"(i) the weld bead being formed such that a cross-sectional width W satisfies a formula (1) below, the cross-sectional width W being a width of a cross section from one boundary between a Zn-based coating layer and the weld bead to the other boundary between the Zn-based coating layer and the weld bead on the first sheet surface, and the cross section being obtained by cutting the weld bead by a plane orthogonal to a direction in which the weld bead extends,"

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*